No. 650,331. Patented May 22, 1900.
W. M. LEWIS.
POTATO DIGGER.
(Application filed Aug. 16, 1899.)

(No Model.)

Witnesses:

Inventor
William M. Lewis
per A. D. Lewis
Atty.

THE NORRIS PETERS CO., PHOTO-LITHO., WASHINGTON, D. C.

UNITED STATES PATENT OFFICE.

WILLIAM M. LEWIS, OF CARBON BLACK, PENNSYLVANIA, ASSIGNOR OF THREE-FOURTHS TO H. J. LEVIS, OF PITTSBURG, PENNSYLVANIA.

POTATO-DIGGER.

SPECIFICATION forming part of Letters Patent No. 650,331, dated May 22, 1900.

Application filed August 16, 1899. Serial No. 727,431. (No model.)

*To all whom it may concern:*

Be it known that I, WILLIAM M. LEWIS, a citizen of the United States of America, residing at Carbon Black, in the county of Butler and State of Pennsylvania, have invented certain new and useful Improvements in Potato-Diggers; and I do hereby declare the following to be a full, clear, and exact description thereof, reference being had to the accompanying drawings, which form a part of this specification.

This invention relates to certain new and useful improvements in potato-diggers.

The invention has for its object the provision of a horse-power scoop-shovel mounted upon a pair of wheels, and is provided with a means for separating the potatoes from the earth as it passes out from the scoop-shovel. Moreover, the device is simple in construction, practical in use, and comparatively inexpensive to manufacture.

With the above object in view the invention finally consists in the novel construction, combination, and arrangements of parts, as will be hereinafter more specifically described in detail.

In describing the invention in detail reference is had to the accompanying drawings, forming a part of this specification, and wherein like numerals of reference designate like parts throughout the different views, in which—

Figure 1:
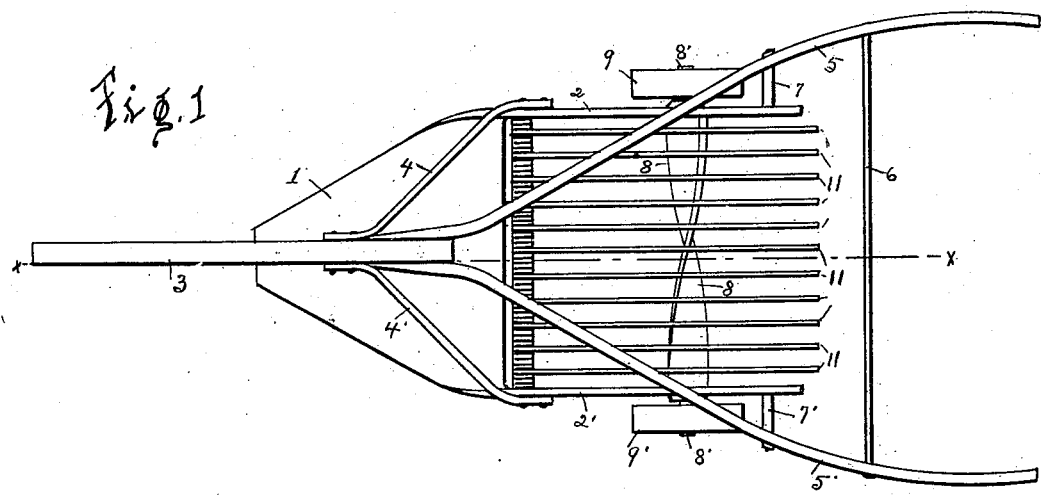
Figure 2:
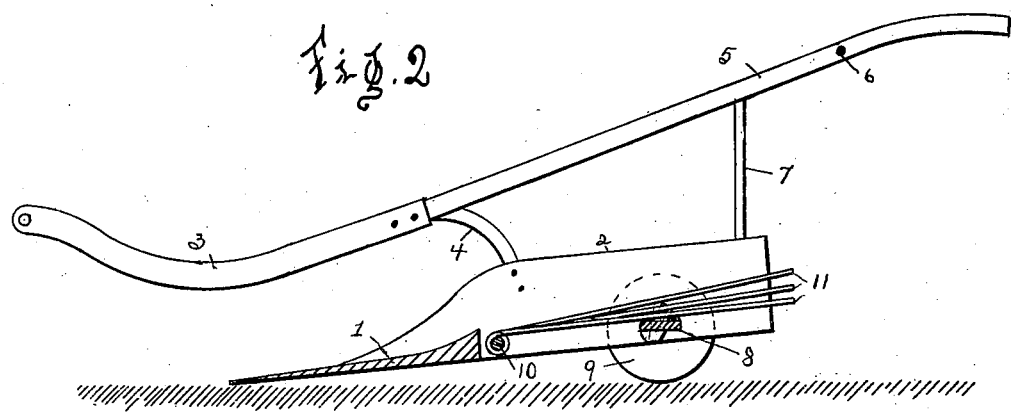

Figure 1 is a plan view of my improved potato-digger. Fig. 2 is a side view of the same, taken in section on the line X X of Fig. 1.

Referring to the drawings for the details of construction, the numeral 1 designates a scoop-shovel provided with side-boards 2 and 2'. The draft-bar 3 is held to the side-boards by the braces 4 and 4', and attached to this draft-bar are the handles 5 and 5', which extend a suitable distance beyond the rear of the device and are rigidly held together by a rod 6 and to the side-boards by braces 7 and 7'. An axle of peculiar construction is employed with this device, and consists of the flat body portion 8, twisted into spiral form, as shown, with the bearings 8' formed upon its ends. These end bearings project loosely through the side-boards and are provided with the wheels 9 and 9'. A rod 10 extends across the rear of the scoop-shovel between the side-boards, and upon this rod is loosely mounted the shaker-bars 11, which have spiral hubs formed upon that end, so as to keep them separated at the proper distance. These shaker-rods extend rearward beyond the ends of the side-boards and rest upon the spirally-formed axle, thus causing each rod to assume a different angle from each other, as will be seen at Fig. 2.

In practice a horse is hitched to the draft-bar. The scoop-shovel is then caused to enter the earth below the potato-beds, and in drawing forward the earth containing the potatoes passes up over the scoop-shovel onto the shaker-bars. These bars move up and down from the revolving of the spirally-formed axle and effectually separate the earth from the potatoes as the earth passes down between the bars, and the potatoes are pushed out over the rear at the ends of the bars and fall upon the top of the ground.

Having thus fully shown and described my invention, what I claim as new, and desire to secure by Letters Patent, is—

1. In a horse-power potato-digger, the combination with the scoop-shovel 1, having extended side-boards 2 and 2', of the flat spirally-formed axle extending across and between the said sides, and provided with traction-wheels 9 and 9', a series of independent shaker-bars pivotally connected at the rear of the shovel-scoop, between and extending beyond the side-boards, adapted to be operated by the spirally-formed axle beneath, substantially as and for the purpose described.

2. In a horse-power potato-digger, the combination with the pivoted shaker-bars, of a means whereby the said bars are operated comprising a spirally-formed axle extending across at right angles beneath the said bars and which is provided with traction-wheels 9 and 9' whereby it is rotated, substantially as shown and described.

In testimony whereof I have hereunto affixed my signature in the presence of two subscribing witnesses.

WILLIAM M. LEWIS.

Witnesses:
J. S. SCOTT,
CHARLES FLEMMING.